United States Patent [19]

Johnson

[11] Patent Number: 4,619,465
[45] Date of Patent: Oct. 28, 1986

[54] SHIM FOR ADJUSTING CAMBER

[76] Inventor: Robert D. Johnson, 2562 Trevino Pl., Mesa, Ariz. 85205

[21] Appl. No.: 687,916

[22] Filed: Dec. 31, 1984

[51] Int. Cl.⁴ ............................................. B62D 17/00
[52] U.S. Cl. .................................... 280/661; D8/354; 384/626; 403/4; 403/98
[58] Field of Search ................... 280/661, 96.1; 403/4, 403/98, 409, DIG. 8; 188/79.5, 196 M, 196 B, 196 V, 201; 308/244, 274; 180/253, 254; 411/535; D8/354; 254/104; 384/626

[56] References Cited

U.S. PATENT DOCUMENTS

| | | | |
|---|---|---|---|
| 2,281,555 | 5/1942 | Castiglia | 280/661 |
| 2,772,596 | 12/1956 | Trussell | 411/535 |
| 3,123,350 | 3/1964 | Zeigler et al. | 280/661 X |
| 4,037,680 | 7/1977 | Grove | 280/661 X |
| 4,194,760 | 3/1980 | Shiomi et al. | 280/661 |
| 4,195,862 | 4/1980 | Specktor et al. | 280/661 |
| 4,466,635 | 8/1984 | Okada et al. | 280/661 |

Primary Examiner—John J. Love
Assistant Examiner—Mitchell J. Hill
Attorney, Agent, or Firm—Drummond & Nissle

[57] ABSTRACT

An improved method for aligning the wheels on a vehicle having a suspension system of the general type including a vertically disposed shock strut and a spindle having an upper and a lower arm bolted so the shock strut such that when the securing bolt is removed from the upper arm and the bolt securing the lower arm to the strut is loosened, the spindle can be pivoted about the bolt passing through the lower arm.

1 Claim, 7 Drawing Figures

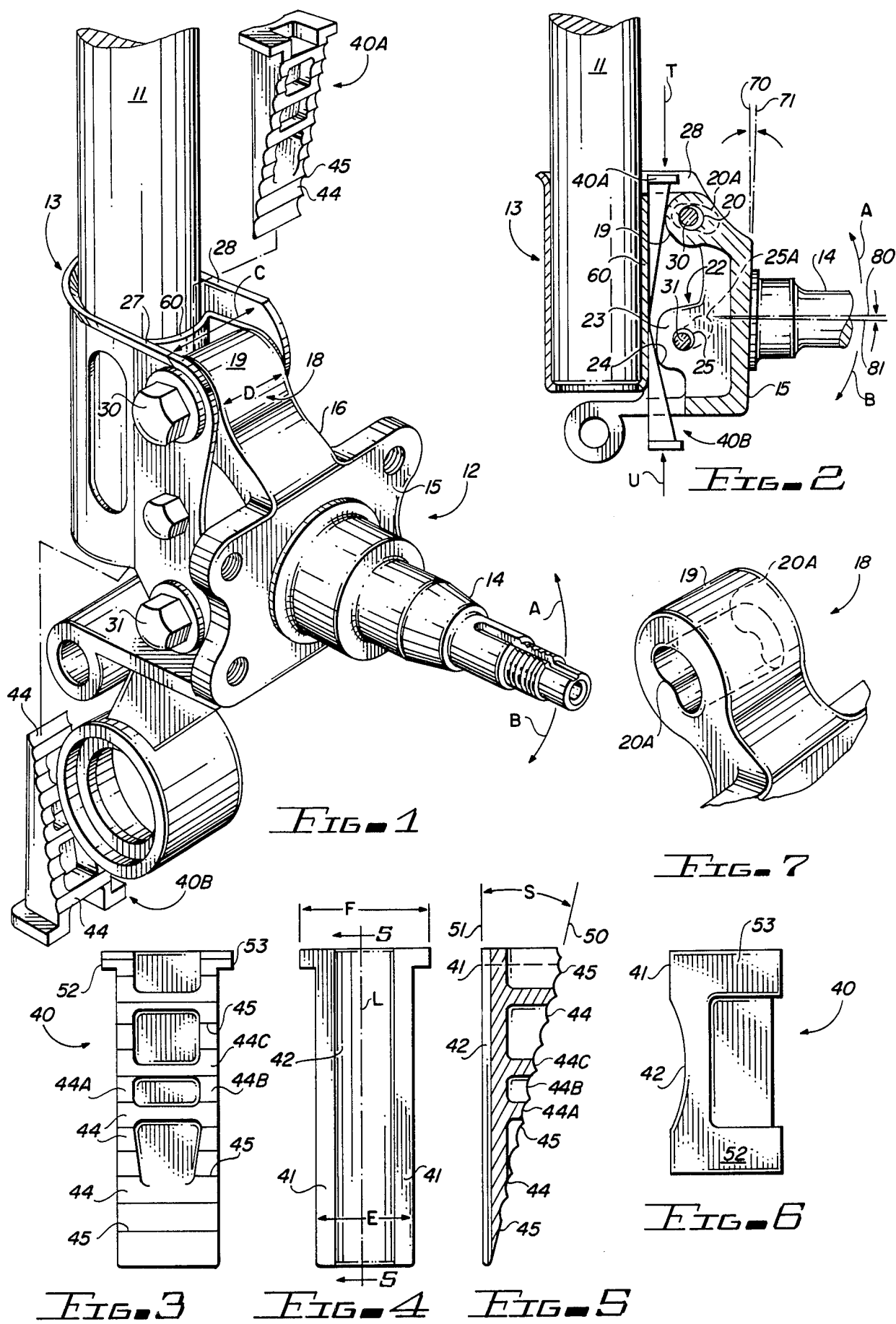

SHIM FOR ADJUSTING CAMBER

This invention pertains to apparatus for aligning the wheels on a vehicle.

More particularly, the invention pertains to a wheel alignment method in which the camber of a vehicle wheel is adjusted by interposing a shim between the shock strut and the wheel spindle bolted to the strut.

In another respect, the invention relates to a method for aligning wheels which permits the positive or negative camber of a wheel spindle to be adjusted without removing the spindle from the shock strut.

Suspension systems of the type associated with the rear wheels on the 1984 Ford Tempo and Topaz are well known in the art. Other vehicles which have suspension systems of the general type found on the rear suspension of 1984 Ford Tempo and Topaz automobiles include the 1984 Ford Lynx, EXP, LN7 and Escort (rear suspension); 1984 Chevrolet Citation (front suspension); 1984 Toyota Tercel 4-Wheel (front suspension); 1984 Chrysler Aries, Omni 400, Omni 600, and Colt Hatch Back (front suspension); 1984 Nissan Sentra; 1984 Fiat 128-131, Brava and X19 (front suspension on all and rear suspension on the X19); 1984 Ford Fiesta (front suspension); 1984 Honda Civic (rear suspension); 1984 Mazda GLC (rear suspension; and, the 1984 Porsche (front suspension). Such suspension systems include a vertically disposed shock strut and a spindle bolted to the strut. The spindle includes an upper and lower arm extending rearwardly toward the strut. A cylindrical passageway is formed through each arm. Each passageway receives a bolt which is utilized to secure the spindle to the shock strut. There presently does not appear to be a method for quickly and accurately adjusting the negative and positive camber of the spindle.

Accordingly, it would be highly desirable to provide a method and apparatus which permitted the ready adjustment of the camber of spindles formed and attached to shock struts in the general manner found on the rear suspension systems of 1984 Ford Tempo and Topaz automobiles.

Therefore, it is a principal object of the invention to provide an improved method for aligning the wheels of a vehicle.

A further object of the invention is to provide an improved method for aligning the wheels on a vehicle having a suspension system of the general type including a vertically disposed shock strut and a spindle having an upper and a lower arm bolted to the shock strut such that when the securing bolt is removed from the upper arm and the bolt securing the lower arm to the strut is loosened, the spindle can be pivoted about the bolt passing through the lower arm.

Another object of the invention is to provide an improved method for adjusting the positive or negative camber of a wheel carried by a spindle in the general type of suspension system described above.

Still a further object of the instant invention is to provide an improved wheel alignment method which permits the spindle in the general type of suspension system described above to be quickly adjusted to desired specifications without requiring that the spindle be completely detached from the shock strut.

These and other, further and more specific objects and advantages of the invention will be apparent to those skilled in the art from the following detailed description thereof, taken in conjunction with the drawings, in which:

FIG. 1 is a perspective view illustrating the utilization of the method of the invention to adjust the camber of a spindle in the rear suspension of a 1984 Ford Topaz or Tempo;

FIG. 2 is a partial side section view of the apparatus of FIG. 1 further illustrating the practice of the method of the invention:

FIG. 3 is a front view of the presently preferred embodiment of the alignment shim utilized in the practice of the method of the invention.

FIG. 4 is a rear view of the shim of FIG. 3 illustrating further construction details thereof;

FIG. 5 is a side section view of the shim of FIG. 4 taken along section line 5—5 thereof;

FIG. 6 is as top view of the shim of FIG. 3; and,

FIG. 7 is a perspective view of a portion of the apparatus of FIG. 1.

Briefly, in accordance with my invention, I provide an improved method for adjusting the camber of a wheel carried by a vehicle suspension system including an elongate vertically disposed shock strut; a spindle; and, means for interconnecting the spindle and the strut. The spindle includes a base; an elongate member attached to the base and projecting outwardly therefrom and shaped and dimensioned to rotatably carry the wheel, an upper arm attached to the base and projecting rearwardly therefrom and including a distal end having an arcuate outer surface, an elongate aperture formed therethrough; a lower arm attached to said base and projecting rearwardly therefrom and including a distal end having an arcuate outer surface, and an elongate aperture formed therethrough. The means for interconnecting the spindle and strut is connected to the strut and includes an upper aperture and a lower aperture formed therethrough. A first spindle securing bolt extends through the upper aperture of the interconnecting means and the elongate aperture of the upper arm of the spindle. A second spindle securing bolt extends through the lower aperture of the interconnecting means and the elongate aperture of the lower arm of the spindle. One of the spindle securing bolts has a cross-sectional area less than the cross-sectional area of at least one of the aperture formed through the interconnecting means to receive said one of the spindle securing bolts and the elongate aperture formed through one of the lower and upper arms to receive said one of the spindle securing bolts. The interconnecting means is shaped and dimensioned such that the spindle securing bolts can maintain the spindle in position with respect to the strut with the arcuate outer surfaces of the spindle arms spaced away from the strut. The improved alignment method comprises the steps of removing the wheel from the spindle; loosening the spindle securing bolts; pivoting the spindle a desired amount about the other of said first and second spindle securing bolts; inserting a wedge-shaped shim between and contacting both the strut and the arm carrying said one of the spindle securing bolts; tightening the spindle securing bolts; and, mounting the wheel on the spindle. The shim includes an elongate rear surface contacting the strut and having a longitudinal axis, and a front surface angled with respect to the rear surface and having a plurality of parallel arcuate grooves perpendicular to the longitudinal axis of the rear surface, one of the arcuate grooves being contacted by the arcuate outer surface of the arm having the elongate aperture which receives said one of the spindle securing bolts.

Turning now to the drawings, which depict the presently preferred embodiment and best mode of the invention for the purpose of illustrating the practice thereof and not by way of limitation of the scope of the invention, and in which identical reference characters correspond to like elements throughout the several views, FIGS. 1 and 2 illustrate suspension components generally equivalent to those found in the rear suspension system of a 1984 Ford Tempo and Topaz and including vertically disposed shock strut 11, spindle 12, and U-shaped bracket 13 interconnecting strut 11 and spindle 12. In FIGS. 1 and 2 spindle 12 generally corresponds to Ford Part No. 4A013 and strut 11 and bracket 13 generally corresponds to the lower portion of Ford Part No. 18125 in the rear suspension of a 1984 Ford Tempo and Topaz. Other associated suspension parts have been omitted for the sake of clarity. For example, the upper end of shock strut Part No. 18125 is attached to Ford Part No. 5560 (not shown), while Ford Part No. 5A893 (not shown) slides over bracket 13.

Spindle 12 includes elongate, tapered, conical member 14 shaped and dimensioned to rotatably carry a wheel. Member 14 is attached to base 15. Upper arm 16 is connected to and rearwardly depends from base 15. Distal end 18 of arm 16 is provided with arcuate outer surface 19. Cylindrical aperture 20 extends through arm 16. Elongate aperture 20 could, as indicated by dashed lines 20A, be arcuate. Lower arm 22 is connected to and rearwardly depends from base 15. Distal end 23 of arm 22 is provided with arcuate outer surface 24. Cylindrical aperture 25 extends through arm 22. Elongate aperture 25 could, as indicated by dashed lines 25A, be arcuate instead of cylindrical in shape. Bracket 13 is fixedly secured to strut 11 and includes wings 27, 28 each having an upper circular aperture (not visible) formed therethrough to receive bolt 30 which extends through aperture 20 of arm 18. Wings 27, 28 also each have a lower circular aperture (not visible) formed therethrough to receive bolt 31 which extends through aperture 25 of lower arm 22. The circular apertures formed through wings 27, 28 can, instead of being circular, be arcuate and shaped in the manner represented by dashed lines 20A and 25A. The head of bolts 30, 31 are visible in FIG. 1. the nuts securing the threaded ends of bolts 30, 31 extend outwardly away from wing 28 and arms 18, 22 along with the nuts threaded thereon. The threaded ends of bolts 30 and 31, along with the nuts turned thereon, are not visible in FIGS. 1 and 2.

In FIG. 2, the diameter and cross-sectional area of aperture 20 is greater than the diameter and cross-sectional area of the shaft of bolt 30 passing therethrough. While Fig. 2 also shows the diameter and cross-sectional area of the shaft of bolt 31 as being less than the diameter and cross-sectional area of aperture 25, during the practice of the method of the invention the diameter of the shaft of bolt 31 is, as will be described, typically approximately equivalent to that of aperture 25.

When the diameter of the shaft of bolt 31 is generally equivalent to that of aperture 25 and the diameter of the shaft of bolt 30 is less than the diameter of aperture 20, the nuts on bolts 30 and 31 can be loosened and spindle 12 can, as indicated by arrows A and B in FIGS. 1 and 2, be pivoted a short distance about bolt 31 to alter the positive or negative camber of spindle nose 14 and of the wheel carried on spindle 12. The smaller diameter and cross-sectional area of bolt 30 with respect to the diameter and cross-sectional area of aperture 20 provides the play which permits the limited pivoting of spindle 12 about bolt 31.

When the diameter of the shaft of bolt 31 is less than the diameter of aperture 25 and the diameter of the shaft of bolt 30 is generally equivalent to the diameter of aperture 20, the nuts on bolts 30 and 31 can be loosened and spindle 12 can, as indicated by arrows A and B in FIGS. 1 and 2, be pivoted a short distance about bolt 30 to alter the positive or negative camber of spindle nose 14 and of the wheel carried on spindle 12. The smaller diameter and cross-sectional area of bolt 31 with respect to the diameter and cross-sectional area of aperture 25 provides the play which permits the limited pivoting of spindle 12 about bolt 30.

The alignment shim used in the method of the invention is generally indicated by reference character 40 in FIGS. 1–6. Shim 40 includes a rear surface having arcuate groove 42 centered on longitudinal axis L and having elongate parallel co-planar elongate panel surfaces 41. The front surface of shim 40 includes parallel arcuate grooves 44 and ridges 45. Ridges 45 are coplanar. In FIG. 5 line 50 represents the imaginary plane passing through ridges 45 and line 51 represents the imaginary plane passing through surfaces 41. The angle between plane 50 and 51 is indicated by arrows S. The curvature of each groove 44 generally corresponds to the curvature of surfaces 19, 24. Consequently, in FIG. 2 the particular concave grooves 44 bearing against surfaces 19 and 24 generally contact surfaces 19, 24 at substantially all points on the surface of the grooves 44.

As shown in FIG. 3, ledges 45 are linear in form. Shim 41 can be shaped and dimensioned such that ledges 45 are flat planar surfaces similar to surfaces 41 on the rear surface of shim 40. In FIG. 5 the curvature and depth of each concave arcuate groove 44 is identical. The curvature and depth of each groove 44 formed in wedge 41 can be varied as desired.

When bolts 30, 31 are the bolts originally provided on a vehicle by an automobile manufacturer, the cross-sectional area of the shafts of bolts 30, 31 is generally equivalent to the cross-sectional area of apertures 20, 25 and of the apertures formed through wings 27, 28. In utilizing the method of the invention to adjust for the first time the camber of a wheel on a vehicle equipped with bolts 30 and 31 originally provided by the manufacturer, the camber of the wheel is determined and the wheel is removed from spindle 12. The nuts on bolts 30, 31 are loosened. Bolt 30 is removed and replaced with a new bolt 30 having a cross-sectional area less than that of aperture 20. When new bolt 30 is installed, the position of spindle 12 can be slightly rotated upwardly or downwardly in the directions indicated by arrows A and B in FIGS. 1 and 2. After the new bolt 30 is installed, wedge 40A is inserted between arm 16 and arcuate plate 60 of strut 11 in the manner illustrated in FIGS. 1 and 2. Wedge 40B is not utilized. The nose 14 of spindle 12 is upwardly lifted to compress shim 40A between surface 19 and strut 11. Bolts 30 and 31 are tightened and the wheel is remounted on spindle 12. The camber of the wheel is determined. If further adjustment of the camber is required, the foregoing procedure is repeated and the position of shim 40A between surface 19 and strut 11 is lowered in the direction of arrow T or is raised in the direction of arrow U in FIG. 2.

In utilizing an alternate embodiment of the invention to adjust for the first time the camber of a wheel of a vehicle equipped with bolts 30 and 31 originally provided by the manufacturer, the camber of the wheel is determined and the wheel is removed from spindle 12. the nuts on bolts 30, 31 are loosened. Bolt 31 is removed and replaced with a new bolt 31 having a cross-sectional area less than that of aperture 25. When new bolt 31 is installed, spindle 12 can be pivoted about bolt 30 and slightly rotated upwardly or downwardly in the directions indicated by arrows A and B in FIGS. 1 and 2. After new bolt 31 is installed, wedge 40B is inserted between arm 22 and arcuate plate 60 of strut 11 in the manner illustrated in FIGS. 1 and 2. Wedge 40A is not utilized. The weight of the spindle compresses shim 40B between surface 24 and strut 11. New bolt 31 and bolt 30 are tightened and the wheel remounted on spindle 12. The camber of the wheel is determined. If further adjustment of the camber is required, the foregoing procedure is repeated and the position of shim 40B between surface 24 and strut 11 is raised in the direction of arrow U or is lowered in the direction of arrow T in FIG. 2.

In utilizing still another embodiment of the invention to adjust for the first time the camber of a wheel of a vehicle equipped with bolts 30 and 31 originally provided by the manufacturer of the vehicle, the camber of the wheel is determined and the wheel is removed from spindle 12. The nuts on bolts 30, 31 are loosened. Both bolts 30, 31 are removed and replaced with new bolts 30, 31 each having a smaller cross-sectional diameter than its respective aperture 20 or 25. Only shim 40A, only shim 40B, or both shims 40A and 40B can then be utilized to adjust the camber of spindle 12 in a manner similar to that described above for when only one of bolts 30 and 31 originally provided on the vehicle is removed and replaced with a bolt having a cross-sectional area less than its respective aperture in arm 16 or 22.

Elongate aperture 20 in arm 16 can, instead of being cylindrical, be formed in the arcuate shape 20A depicted in FIGS. 2 and 7. Aperture 20A has a cross-sectional area greater than that of the shaft of bolt 30 and is formed such that when the nuts of bolts 30 and 31 are loosened spindle 12 can be pivoted about bolt 31 in the directions indicated by arrows A and B in FIGS. 1 and 2. Aperture 25 in arm 22 can, instead of being cylindrical, be formed in the arcuate shape indicated by dashed line 25A in FIG. 2. Elongate aperture 25A has a cross-sectional area greater than the cross-sectional area of the shaft of bolt 31 and is formed such that when the nuts of bolts 30 and 31 are loosened spindle 12 can be pivoted about bolt 30 in the directions indicated by arrows A and B in FIGS. 1 and 2. The cross-sectional areas of the shafts of bolts 30 and 31 and of apertures 20, 20A, 25, 25A are illustrated in FIG. 2 and are perpendicular to the longitudinal axes of bolts 30, 31 and of apertures 20, 20A, 25 25A. In FIG. 2 the longitudinal axes of bolts 30, 31 and apertures 20, 20A, 25, 25A are perpendicular to the plane of the sheet of paper of the drawings. The apertures formed through wings 27, 28 to receive bolts 30, 31 can also be arcuately shaped in the manner represented by dashed lines 20A and 25A, particularly when elongate apertures 20 and 25 are cylindrical.

As would be appreciated by those of skill in the art, the alignment method and shim of the invention can be utilized when each aperture formed in wings 27, 28 for bolt 30 has a cross-sectional area which is greater than the cross-sectional area of the shaft of bolt 30 and each aperture formed in wings 27, 28 for bolt 30 is shaped to permit spindle 12 to be pivoted about bolt 31 in the directions indicated by arrows A and B in FIGS. 1 and 2 after the nuts on bolts 30 and 31 are loosened; when each aperture formed in wings 27, 28 for bolt 31 has a cross-sectional area which is greater than the cross-sectional area of the shaft of bolt 31 and each aperture formed in wings 27, 28 for bolt 31 is shaped to permit spindle 12 to be pivoted about bolt 30 in the directions indicated by arrows A and B in FIGS. 1 and 2 after the nuts on bolts 30 and 31 are loosened; when aperture 20 formed in arm 18 has a cross-sectional area which is greater than the corss-sectional area of bolt 30 and aperture 20 is shaped to permit the rotation of spindle 12 about bolt 31 in the direction indicated by arrows A and B in Figs. 1 and 2 after the nuts on bolts 30, 31 are loosened; and/or, when the aperture 25 formed in arm 22 has a cross-sectional area which is greater than the cross-sectional area of bolt 31 and aperture 25 is shaped to permit the rotation of spindle 12 about bolt 30 in the directions indicated by arrows A and B in FIGS. 1 and 2 after the nuts on bolts 30 and 31 are loosened.

The width E of shim 40 is indicated in FIG. 4 by arrows E and is slightly less than the width D of arm 18 indicated by arrows D in FIG. 1. The distance F between collar portions 52 and 53 of shim 40 is represented by arrows F in FIG. 4 and is greater than the distance between wings 27 and 28 indicated by arrows C in FIG. 1. Consequently, collar portions 52, 53 will contact the upper edges of wings 27, 28 to prevent shim 40A from sliding downwardly between strut 11 and knuckle 18 and completely past arm 16.

In the presently preferred embodiment of shim 40, the angle S between planes 50 and 51 and the shape and dimension of grooves 44 are selected such that the movement from one groove 44 to an adjacent groove alters the camber adjustment of a particular suspension system by one-half of a degree. Accordingly, if shim 40A of FIG. 2 is first positioned between strut 11 and arm 16 with groove 44A (FIGS. 3, 5) contacting surface 19 of arm 16 and is then displaced in the direction of arrow T to a second position in which groove 44B and not groove 44A contacts surface 19, then nose 14 of spindle 12 is, when shim 40A is moved from the first position to the second position, displaced in the direction of arrow B by an amount equivalent to a camber adjustment of one-half of a degree. The increase in camber adjustment caused by moving from groove 44A to 44B can be one-third of a degree, one degree, etc. Further, the camber adjustment need not increase or decrease in equal amounts between adjacent or successive grooves 44. While moving from groove 44A to 44B could result in an increase in camber adjustment of one-half of a degree, moving from groove 44B to 44C could result in a camber adjustment of three-fourths of a degree.

Having described my invention in such terms as to enable those skilled in the art to understand and practice it, and having identified the presently preferred embodiments and best mode thereof, I claim:

1. A method for adjusting the camber of a wheel carried by the suspension assembly of a vehicle, said suspension assembly including
   an elongate vertically disposed strut,
   a spindle including
      a base, an elongate member attached to said base and projecting outwardly therefrom and shaped and dimensioned to rotatably carry said wheel,
an upper arm attached to said base and projecting rearwardly therefrom and including
a distal end having an arcuate outer surface
an elongate aperture formed therethrough,
a lower arm attached to said base and projecting rearwardly therefrom and including
a distal end having an arcuate outer surface,
an elongate aperture formed therethrough,
means for interconnecting said spindle and said strut, said interconnecting means being connected to said strut and including an upper aperture and a lower aperture formed therethrough,
a first spindle securing bolt extending through said upper aperture of said interconnecting means and said elongate aperture of said upper arm,
a second spindle securing bolt extending through said lower aperture of said interconnecting means and said elongate aperture of said lower arm,
one of said spindle securing bolts having a cross-sectional area less than the cross-sectional area of at least one of
said aperture formed through said interconnecting means to receive said one of said spindle securing bolts, and
said elongate aperture formed through one of said lower and upper arms to receive said one of said spindle securing bolts,
said interconnecting means being shaped and dimensioned such that said spindle securing bolts can maintain said spindle in position with respect to said strut with said arcuate outer surfaces of said spindle arms spaced away from said strut, said method comprising the steps of
(a) removing said wheel from said spindle;
(b) loosening said spindle securing bolts;
(c) pivoting said spindle a desired amount about the other of said spindle securing bolts;
(d) inserting a wedge-shaped shim between said strut and said arm carrying said one of said spindle securing bolts, said shim including
(i) an elongate rear surface contacting said strut and having a longitudinal axis, and
(ii) a front surface angled with respect to said rear surface and having a plurality of parallel arcuate grooves perpendicular to said longitudinal axis of said rear surface, one of said arcuate grooves being contacted by said arcuate outer surface of said arm having said elongate aperture to receive said one of said spindle securing bolts;
(e) tightening said spindle securing bolts; and,
(f) mounting said wheel on said spindle.

* * * * *